United States Patent [19]

Nash

[11] 4,361,281
[45] Nov. 30, 1982

[54] EXHAUST NOZZLE

[75] Inventor: Dudley O. Nash, Cincinnati, Ohio

[73] Assignee: General Electric Company, Cincinnati, Ohio

[21] Appl. No.: 166,286

[22] Filed: Jul. 7, 1980

[51] Int. Cl.³ .............................................. B64C 15/06
[52] U.S. Cl. ................................................. 239/265.37
[58] Field of Search ..................... 239/265.33, 265.39, 239/265.41, 265.35, 265.37, 265.43, 602; 60/242

[56] References Cited

U.S. PATENT DOCUMENTS

| 2,846,843 | 8/1958 | Clark et al. | 60/242 |
| 3,612,400 | 10/1971 | Johnson | 239/265.33 X |
| 3,730,436 | 5/1973 | Hadden et al. | 239/265.39 |
| 3,873,027 | 3/1975 | Camboulives et al. | 239/265.33 |
| 3,973,731 | 8/1976 | Thayer | 239/265.39 |
| 3,979,067 | 9/1976 | Nash | 239/265.35 |
| 4,000,854 | 1/1977 | Konarski et al. | 239/265.35 |

OTHER PUBLICATIONS

Report No. NASA CR-135289/General Electric Co. Jun. 1978, pp. 11 and 14.
Report No. NASA CR-135252/Stevens Feb. 1978, pp. 8, 21, 75, 139.

Primary Examiner—Robert B. Reeves
Assistant Examiner—Gene A. Church
Attorney, Agent, or Firm—Francis L. Conte; Derek P. Lawrence

[57] ABSTRACT

An exhaust nozzle for an engine in which the exhaust opening is defined by spaced flap assemblies and side members. The flap assemblies are pivotable to permit variation in the size and shape of the opening. The nozzle includes actuation means having an output and pivoting means for transforming the output into pivotal movement of the flap assemblies. Cams are included on the flap assemblies to provide at least a portion of the pivotal movement.

8 Claims, 6 Drawing Figures

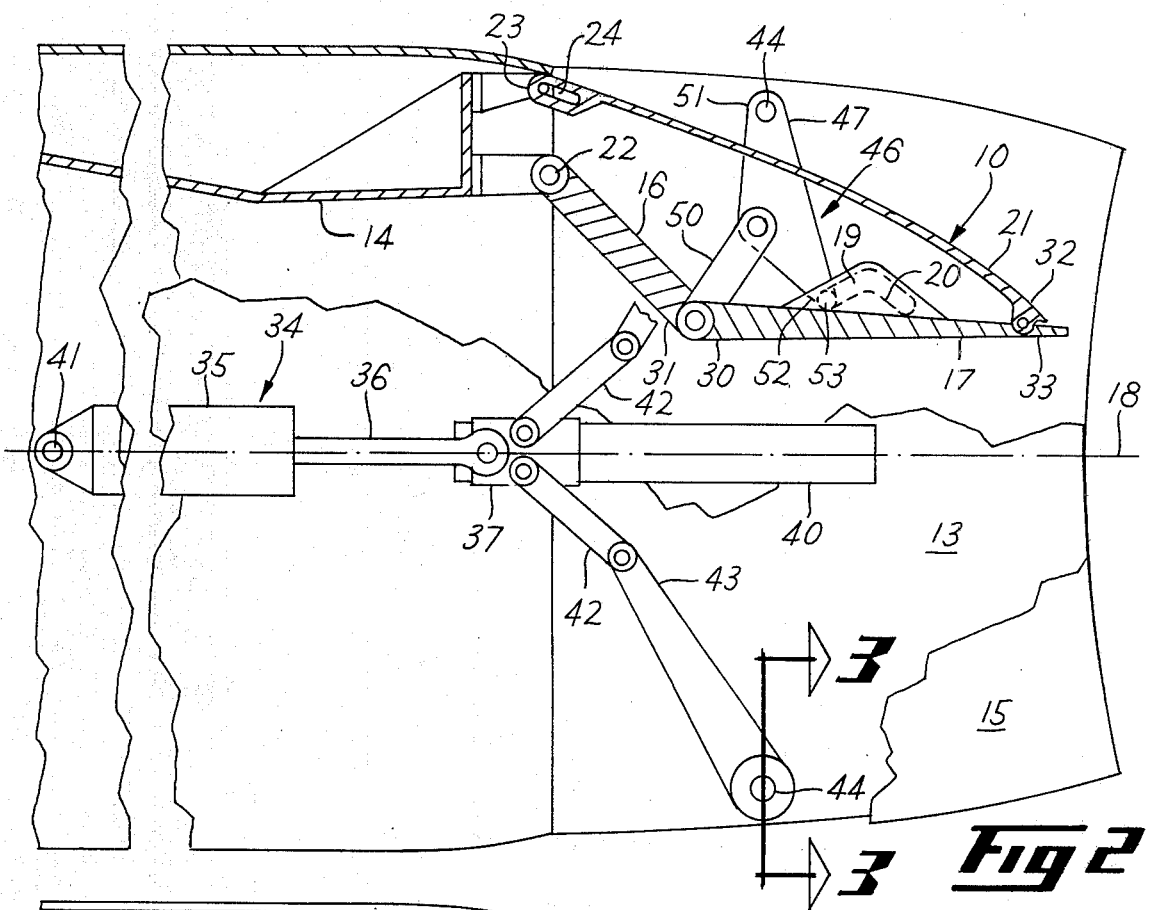
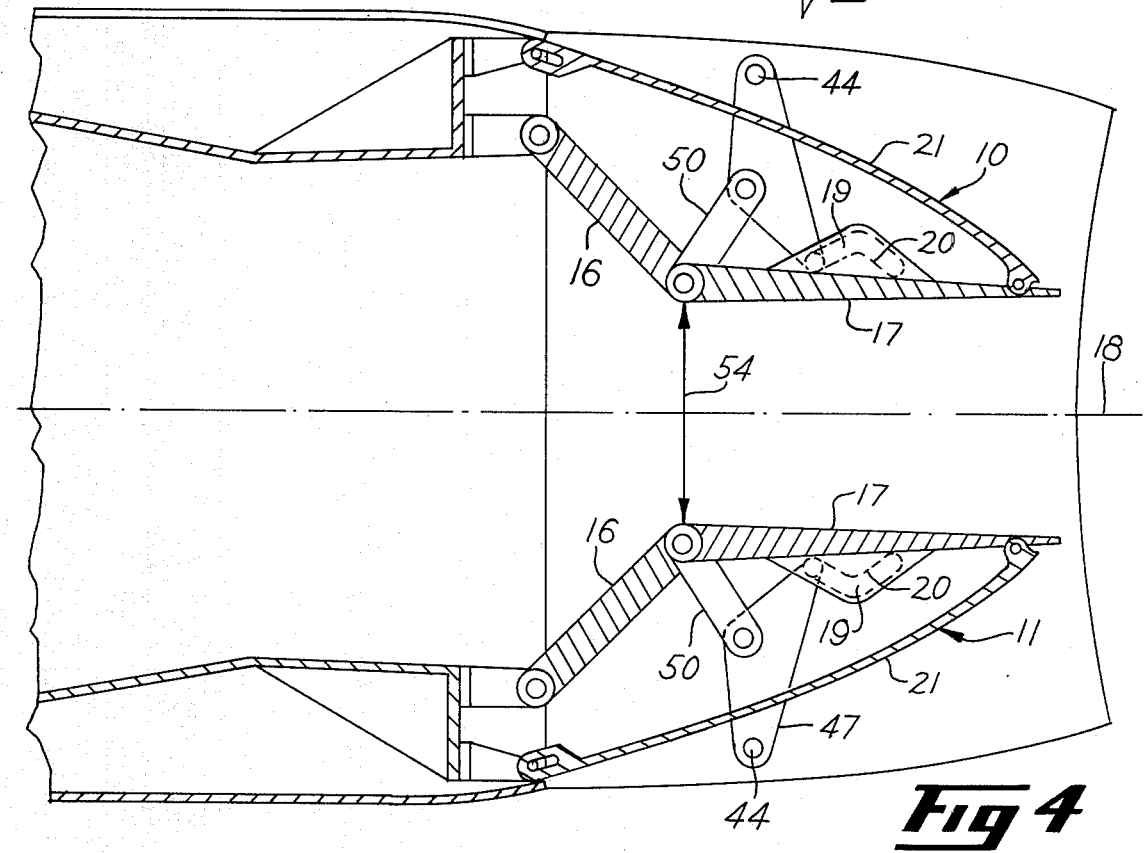

EXHAUST NOZZLE

BACKGROUND OF THE INVENTION

1. Field of the Invention

This invention relates to exhaust nozzles and particularly to a new and improved exhaust nozzle in which the size and shape of the exhaust opening can be varied.

2. Description of the Prior Art

The efficiency of a gas turbine engine can be improved through the use of an exhaust nozzle in which the size and shape of the exhaust opening can be varied in response to changes in operating conditions, such as, in the case of an aircraft engine, changes in airspeed and altitude. In the case of a two-dimensional convergent-divergent exhaust nozzle, i.e., a 2D-CD nozzle, varying the size and shape of the exhaust opening can present particular problems. By a "two-dimensional" nozzle it is meant that the nozzle has a generally rectangular exhaust opening with the variable geometry taking place in a plane and not affecting the third dimension. By "convergent-divergent" it is meant that in the downstream direction, the area of the exhaust opening of the nozzle first decreases to a position of minimum area, called the throat, and then increases.

An approach to varying the size and shape of an aircraft 2D-CD nozzle is to utilize a plurality of moveable flaps to define the upper and lower boundaries of the exhaust opening. Such flaps, however, are subject to heavy pressure loads from the exhaust gases. The actuation mechanisms which move the flaps must be capable of working under such pressure loads and are thus often relatively large and heavy. The extra size of the mechanism can cause an increase in drag and the extra weight requires additional thrust to support the weight. Thus, large and heavy actuation mechanisms for 2D-CD nozzles often reduce the engine efficiency for which the nozzle was designed.

Another problem encountered with upper and lower moveable flaps in a 2D-CD nozzle is in the synchronization of the actuation mechanisms. In order to maintain the direction of engine thrust along the engine centerline, all movements of the upper and lower flaps must be synchronized such that they are equal in magnitude but opposite in direction. Where there are separate actuation mechanisms for the upper and lower nozzle flaps, synchronization means must be included to ensure synchronized movement between the flaps. Such synchronization means not only can increase nozzle weight and size, but can also increase the production cost of the nozzle.

Another problem encountered in the use of 2D-CD nozzles is that it is difficult to fabricate a common nozzle flap actuation mechanism which can be used on different aircraft/engine combinations. One reason for this is that for a specific aircraft/engine combination, there exists a schedule such that for each value of nozzle throat area, there is a corresponding optimum value of nozzle discharge area to obtain maximum engine efficiency. Since each actuation mechanism is fabricated so as to operate according to a certain throat area/discharge area schedule, it can only be used on an aircraft/engine combination which utilizes that schedule. To change the schedule of an actuation mechanism which uses only mechanical link arms to effect movement of the nozzle flaps requires replacement of the link arms with longer or shorter ones. Such replacement is time-consuming and expensive, involving a redesign of the entire actuation mechanism.

In view of the above-noted problems, it is, therefore, an object of the present invention to provide an improved exhaust nozzle having flap actuation means which are compact in size and weight and which thus promote engine efficiency.

Another object of the present invention is to provide an exhaust nozzle in which no synchronization is required between flap actuation means.

Yet another object of the present invention is to provide an exhaust nozzle in which the throat area/discharge area schedule of the actuation means can be simply and inexpensively modified.

SUMMARY OF THE INVENTION

The present invention, in accordance with one embodiment thereof, comprises an exhaust nozzle for an engine in which the size and shape of the exhaust opening can be varied.

The exhaust nozzle includes pivotable flap assemblies, actuation means, and pivoting means for transforming the output of the actuation means into pivotal movement of the flap assemblies. Each flap assembly includes at least one pivotable flap including camming means thereon.

In a particular embodiment, each flap assembly comprises a pivotable convergent flap and a pivotable divergent flap. Each divergent flap includes at least one cam defined on a surface thereof which is engaged by a follower on the pivoting means in such a manner as to effect pivotal movement of the divergent flap. The exhaust nozzle further comprises transversely spaced apart side plates, and each flap assembly includes an outer flap disposed outwardly of the convergent and divergent flaps. The actuation means comprises an actuator, an output arm, and rotatable shafts connected with the output arm by linkage members and lever arms. Each pivoting means comprises a crank including a follower, the crank being connected with a rotatable shaft and with a link arm which is connected with a convergent flap. The output of the actuation means effects pivotal movement of the flap assemblies which thereby varies the size and shape of the exhaust opening of the nozzle.

BRIEF DESCRIPTION OF THE DRAWING

This invention will be better understood from the following description taken in conjunction with the accompanying drawing, wherein:

FIG. 2 is a fragmentary cross-sectional view of the exhaust nozzle showing an actuation means and an upper flap assembly.

FIGS. 4 through 6 are cross-sectional views of the exhaust nozzle showing different pivotal positions of the flap assemblies such that the size and shape of the exhaust opening is varied.

DESCRIPTION OF THE PREFERRED EMBODIMENT

Figure 1:
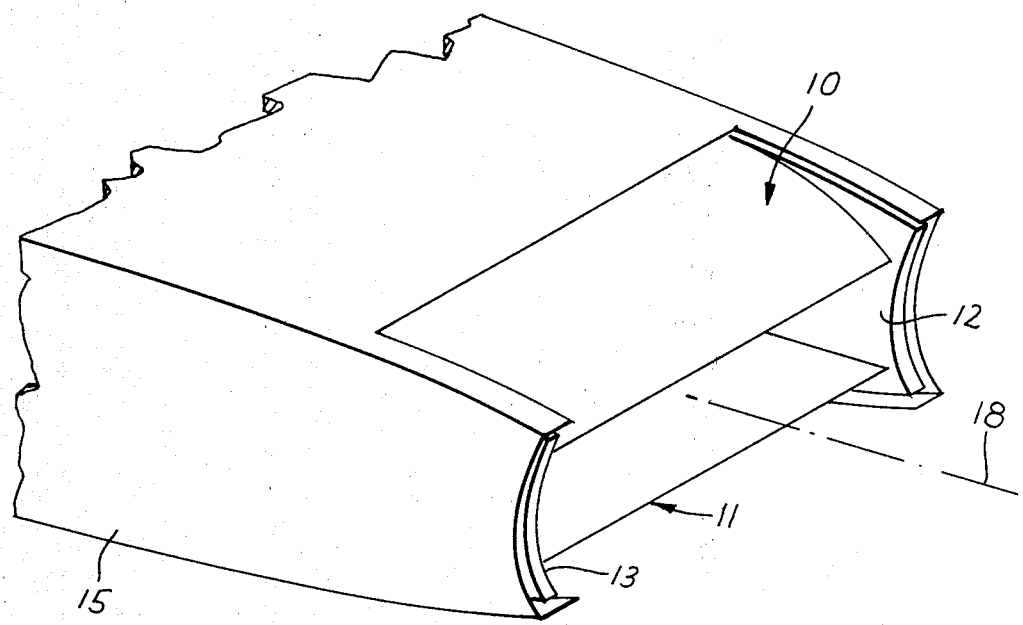
FIG. 1 is a fragmentary rear perspective view of an exhaust nozzle incorporating features of the present invention.

Turning now to a consideration of the drawing, and in particular, to FIG. 1, there is shown an exhaust nozzle for an engine. The exhaust nozzle provides an opening for discharging engine exhaust gases to the atmosphere at the highest possible velocity to produce the greatest momentum change and thrust. The exhaust opening is defined by a plurality of spaced flap assemblies, such as, for example, the upper flap assembly 10 and the lower flap assembly 11. The nozzle also preferably includes two transversely spaced apart side members such as the side plates 12 and 13 which define the side boundaries of the exhaust opening. The exhaust nozzle is mounted downstream of and adjacent, and the side plates 12 and 13 extend downstream from, a structural portion of the engine, such as the exhaust casing 14 (shown in FIG. 2). Alternatively, the exhaust nozzle can be mounted on the engine nacelle 15.

Although the above-described nozzle arrangement defines an exhaust opening which is two-dimensional, that is, one which is generally rectangular, it is to be understood that this invention can be utilized in any other type of exhaust nozzle as well.

As can be seen in FIGS. 1 and 2, the upper and lower flap assemblies 10 and 11 are preferably spaced vertically apart and equidistantly from the nozzle longitudinal axis, depicted by the dashed line 18. The preferred embodiment of the nozzle is also that of a convergent-divergent nozzle. By "convergent-divergent" it is meant that as the exhaust gases move through the nozzle in the downstream direction, the area of the exhaust opening first decreases, causing the gases to converge until they reach a position of minimum area between the upper and lower flap assemblies 10 and 11, known as the throat. The area then increases, causing the gases to continue accelerating to high thrust producing supersonic velocities. As seen in FIG. 2, each flap assembly, such as the upper flap assembly 10, comprises at least one pivotable flap, and preferably comprises a pivotable convergent flap 16 and a pivotable divergent flap 17. One flap, and preferably the divergent flap 17, includes camming means thereon, such as at least one cam 20 defined on a surface thereof. Preferably, a cam 20 is defined at each transverse side of the outer surface of each divergent flap 17. For reasons to be explained hereinafter, the cam 20 can include a recess 19 therein having a shape corresponding to the shape of the cam 20. In order to provide aerodynamically smooth upper and lower outer surfaces for the nozzle, an outer flap 21 is preferably disposed outwardly of each convergent and divergent flap 16 and 17.

The upstream end 22 of each convergent flap 16 is pivotally connected with a structural portion of the engine, such as for example, the exhaust casing 14. The upstream end 23 of each outer flap 21 is likewise pivotally connected with a structural portion of the engine such as the exhaust casing 14. The pivotal connection at the upstream end 23 can include an elongated opening 24 so as to permit slight axial translation of the outer flap 21 as it pivots to prevent binding of the flap assembly. The exhaust casing 14 itself can be either fixed in position or moveable relative to the engine nacelle in order to provide thrust vectorability.

The upstream end 30 of the divergent flap 17 is pivotally connected with the downstream end 31 of the convergent flap 16. The downstream end 32 of the outer flap 21 is pivotally connected with the downstream end 33 of the divergent flap 17. Thus, the entire flap assembly is pivotable.

Preferably, each upper and lower flap assembly 10 and 11, including the convergent flap 16, the divergent flap 17, and the outer flap 21, extends transversely substantially the entire distance between the side plates 12 and 13. The exhaust gases thus exit the nozzle through the opening defined by the upper and lower flap assemblies 10 and 11 and the side plates 12 and 13.

In order to attain maximum engine efficiency under varying operating conditions, the size and shape of the exhaust opening is made to be variable by pivoting the upper and lower flap assemblies 10 and 11. More specifically, the size of the throat, or location of minimum area between the upper and lower flap assemblies 10 and 11, can be varied. As the size of the throat is varied, the angle of convergence of the convergent flaps 16 and the angle of divergence of the divergent flaps 17 are also varied.

Pivoting of the upper and lower flap assemblies 10 and 11 is accomplished by actuation means and pivoting means. Referring again to FIG. 2, the nozzle preferably includes a pair of actuation means 34, one of which is associated with each of the side plates 12 and 13 and is disposed outwardly of the exhaust casing 14 and its respective side plate.

The actuation means comprises an actuator 35 having an output. The output of the actuator 35 can be in the form of an output element, such as the axially translatable output arm 36 extending from the actuator 35. The output arm 36 includes a slider 37 which is guided to slide on a track 40. The actuator 35 is connected with a structural portion of the engine or the engine nacelle 15. The connection can be a pivotal connection as at 41, such that in a vectorable nozzle, the actuation means 34 will remain operable even when the nozzle is pivoted for thrust vectoring.

Figure 3:
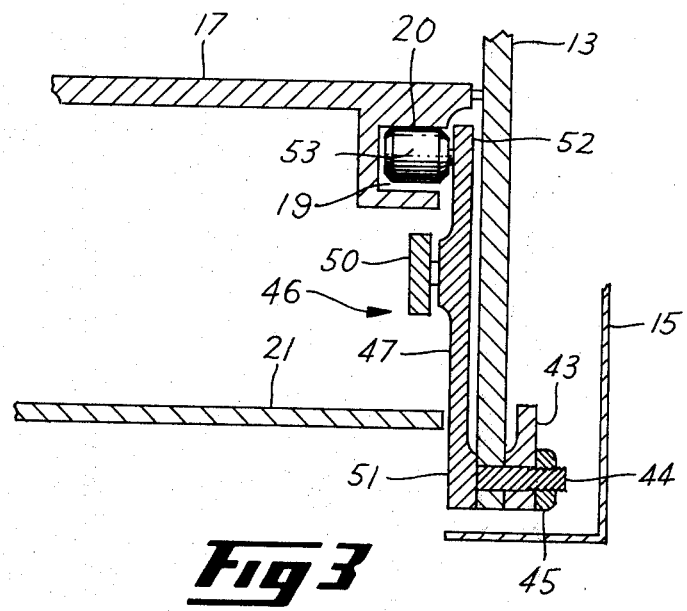
FIG. 3 is a cross-sectional view taken along line 3—3 of FIG. 2 and showing pivoting means.

Each actuation means 34 preferably also includes two linkage members, two lever arms, and two rotatable shafts. The two linkage members 42 are pivotally connected with the output arms 36. Each of the two lever arms 43 is pivotally connected at one end to one of the linkage members 42 and is fixedly connected at the other end to an upper or a lower rotatable shaft 44. The upper rotatable shaft 44 is disposed substantially adjacent the upper flap assembly 10 and the lower rotatable shaft 44 is disposed substantially adjacent the lower flap assembly 11. As can be seen in FIG. 3, each upper and lower rotatable shaft 44 extends through and is supported by a side plate 12 or 13. The lever arm 43 can be connected with the shaft 44 by any appropriate means, such as by the nut 45. The above-described actuation means promotes engine efficiency by being compact in size and weight.

Disposed inwardly of each of the side plates 12 and 13 is at least one, and preferably four, pivoting means 46, as seen in FIGS. 2 and 3. The function of each pivoting means 46 is to transform the output of an actuation means 34 into pivotal movement of an upper or a lower flap assembly 10 or 11. Each pivoting means 46 is substantially adjacent an upper or a lower rotatable shaft 44 and comprises a crank 47 and a link arm 50. The crank 47 includes an end 51 which is fixedly connected with an upper or a lower rotatable shaft 44 such that when the rotatable shaft 44 rotates, the crank 47 pivots about the end 51. Another end 52 of the crank 47 comprises a follower which, as the crank 47 is pivoted, engages a cam 20 on a divergent flap 17 and thereby effects pivotal movement of the divergent flap 17. The end 52 which comprises the follower of the crank 47 can include a roller 53 which is received in the recess 19 of the cam 20. The roller 53 being so received in the recess 19 helps prevent inward pivotal movement of the divergent flap 17, particularly when there are no outwardly directed forces being exerted against the divergent flaps, as would occur when the engine is not running.

In an alternative arrangement (not shown), the follower can be included on the divergent flap 17 and the crank 47 can be shaped such that when the crank 47 is pivoted, it acts as a cam and engages the follower of the divergent flap thereby imparting pivotal movement to the divergent flap. Or, in another alternative arrangement (not shown), both the convergent and divergent flaps 16 and 17 can include cams and the crank 47 and the link arm 50 can comprise followers.

The link arm 50 is pivotally connected at one end to the crank 47 and at its other end to the convergent flap 16, preferably at the downstream end 31 of the convergent flap 16. In this arrangement, as the crank 47 pivots, it causes the link arm 50 to move and thereby effects pivotal movement of the convergent flap 16.

The nozzle operates as follows. Referring to FIGS. 2 and 4, the upper and lower flap assemblies 10 and 11 are shown in a pivoted position such that the convergent flaps 16 present a large convergent angle to the exhaust gases flowing through the nozzle and the size of the throat area 54 is relatively small. In this configuration, the output arm 36 of the actuator 35 is in its most upstream position.

Figure 5:
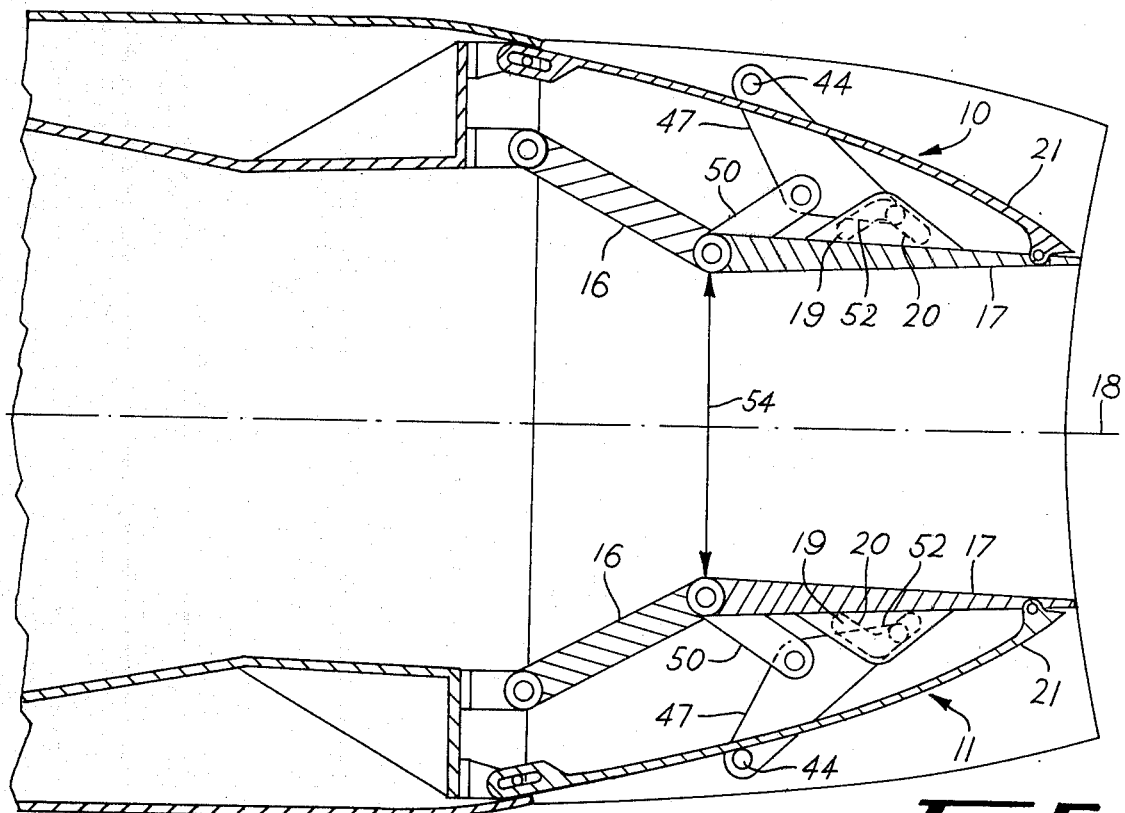

Referring now to FIG. 5, the output arm 36 (shown in FIG. 2) has translated in the downstream direction and through the linkage members 42 and the lever arms 43, has caused the rotatable shaft 44 to rotate. The cranks 47 have been pivoted by and about the rotatable shafts 44 such that the end 52 of the crank 47, which comprises the follower, has engaged the cam 20 of the divergent flap 17. At the same time, the crank 47 has moved the link arm 50 with it such that the link arm effects pivotal movement of the convergent flap 16. The outer flap 21 pivots with the divergent flap 17 with which it is connected. Thus, comparing the positions of the flap assemblies 10 and 11 shown in FIG. 5 with those shown in FIG. 4, the angle of convergence defined by the convergent flap 16 has been decreased, the size of the throat area 54 has been increased, and the divergent angle defined by the divergent flaps 17 remains approximately the same.

Figure 6:
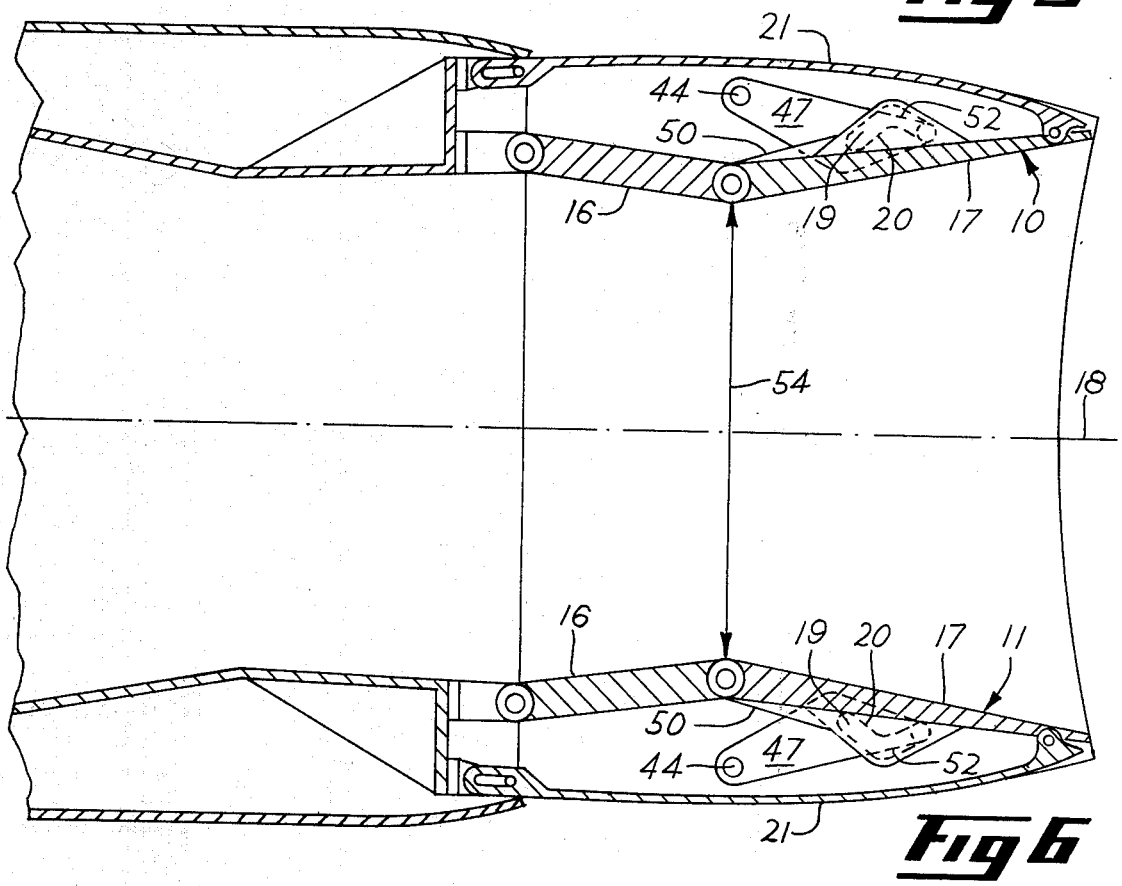

Referring now to FIG. 6, the output arm 36 (shown in FIG. 2) has translated to its most downstream position and, through the linkage members 42 and the lever arms 43, has caused the rotatable shafts 44 to rotate. The cranks 47 have been pivoted by and about the rotatable shafts 44 and the end 52 of the crank 47, which comprises the follower, has traveled over the cam 20 and is on a downstream side of the cam. The crank 47 has also moved the link arm 50 such that the link arm has effected pivotal movement of the convergent flap 16. The outer flap 21 also pivots with the divergent flap 17 with which it is attached. Comparing the positions of the flap assemblies 10 and 11 shown in FIG. 6 with those shown in FIG. 5, it can be seen that the angle of convergence defined by the convergent flaps 16 has been further decreased, the size of the throat area 54 has been further increased, and the divergent angle defined by the divergent flap 17 has been increased.

Thus, the actuation means 34 operating through the pivoting means 46 has effected equal but opposite pivotal movement of the upper and lower flap assemblies 10 and 11 and thereby varied the size and shape of the exhaust opening. Thus, synchronized pivotal movement of the upper and lower flap assemblies has been accomplished without the need of synchronization means because each actuation means operates both the upper and lower flap assemblies 10 and 11. Of course, numerous other upper and lower flap assembly positions are possible by selectively varying the position of the output arm 36 of the actuator 35.

For different aircraft/engine combinations, differing schedules of throat area 54 versus discharge area (the area between the divergent flaps 17) may be required. The shape of the cam 20 determines the relative pivotal positions of the convergent and divergent flaps 16 and 17 at any given output position of the output arm 36. Variations in the positions of the convergent flap 16 and the divergent flap 17, and thus in the schedule, can be simply and inexpensively achieved by selectively modifying the shape of the cam 20.

It is to be understood that this invention is not limited to the particular embodiment disclosed, and it is intended to cover all modifications coming within the true spirit and scope of this invention as claimed.

What is claimed is:

1. An exhaust nozzle mounted downstream of and adjacent to an exhaust casing of an engine comprising:
   (a) a plurality of spaced flap assemblies, each flap assembly comprising:
     (i) a convergent flap having an upstream end pivotally connected with said exhaust casing; and
     (ii) a divergent flap having an upstream end pivotally connected with a downstream end of said convergent flap and including camming means defined at each transverse side of the outer surface thereof;
   (b) at least one actuation means having an output effective for rotating a plurality of rotatable shafts; and
   (c) a plurality of pivoting means for transforming the output of respective ones of said plurality of rotatable shafts of said actuation means through engagement with said camming means into pivotal movement of respective ones of said flap assemblies, each of said plurality of pivoting means comprising:
     (i) a crank having one end fixedly connected with one of said rotatable shafts and an opposite end having a follower thereon for engaging said camming means of a respective divergent flap for effecting pivotal movement thereof;
     (ii) a link arm having one end pivotally connected with an intermediate portion of said crank and an opposite end pivotally connected with said downstream end of a respective convergent flap for effecting pivotal movement thereof.

2. An exhaust nozzle mounted downstream of and adjacent a structural portion of an engine and comprising:
   (a) two transversely spaced apart side members extending downstream from said structural portion;
   (b) a plurality of spaced flap assemblies, each flap assembly comprising a pivotable convergent flap and a pivotable divergent flap, including at least one cam defined on a surface of said divergent flap;
   (c) at least one actuation means having an output and being disposed outwardly of one of said side members and comprising:
     (1) an actuator including an output element;
     (2) two linkage members connected with said output element;

(3) two lever arms, each said lever arm having one end pivotally connected with one of said linkage members; and (4) an upper and a lower rotatable shaft extending through one of said side members, each said upper and lower rotatable shaft being fixedly connected with an end of one of said lever arms; and (d) at least one pivoting means for transforming the output of said actuation means through engagement with said camming means into pivotal movement of said flap assemblies.

3. The exhaust nozzle of claim 2 wherein said output element comprises an axially translatable output arm extending from said actuator.

4. The exhaust nozzle of claim 3 wherein one of said cams is defined at each transverse side of the upper surface of said divergent flap.

5. The exhaust nozzle of claim 4 wherein each said pivoting means is disposed inwardly of one of said side members and adjacent one of said upper or one of said lower rotatable shafts and includes a crank fixedly connected with said upper or said lower rotatable shaft and a link arm pivotally connected with said crank and with said convergent flap for effecting pivotal movement of said convergent flap, said crank including a follower thereon for engaging one of said cams on said divergent flap and thereby effecting pivotal movement of said divergent flap.

6. An exhaust nozzle defining a generally two-dimensional exhaust opening mounted downstream of and adjacent an exhaust casing of an engine, comprising:

(a) two transversely spaced apart side plates extending downstream from said exhaust casing;

(b) upper and lower flap assemblies extending between said side plates, each flap assembly comprising:

(i) a convergent flap having an upstream end pivotally connected with said exhaust casing;

(ii) a divergent flap having an upstream end pivotally connected with said downstream end of said convergent flap and including a cam defined at each transverse side of the outer surface thereof; and (iii) an outer flap disposed outwardly of said convergent and said divergent flaps and having an upstream end pivotally connected with said exhaust casing and a downstream end pivotally connected with a downstream end of said divergent flap;

(c) two transversely spaced apart actuation means having an output, each actuation means being disposed outwardly of one of said side plates and including an upper and a lower rotatable shaft extending through said one of said side plates, said upper and lower rotatable shafts being rotatable by the output of said actuation means;

(d) four pivoting means disposed inwardly of said side plates, each of said pivoting means being adjacent one of said upper or one of said lower rotatable shafts and including a crank fixedly connected with said upper or said lower rotatable shaft and a link arm pivotally connected with said crank and with the downstream end of said convergent flap for effecting pivotal movement of said convergent flap, said crank including a follower thereon for engaging one of said cams of said divergent flap and thereby effecting pivotal movement of said divergent flap.

7. The exhaust nozzle of claim 6 wherein each of said actuation means comprises:

(a) an actuator including an axially translatable output arm extending from said actuator;

(b) two linkage members pivotally connected with said output arm;

(c) two lever arms, each of said lever arms being pivotally connected at one end to one of said linkage members and fixedly connected at the other end to one of said upper or lower shafts.

8. The exhaust nozzle of claim 6 wherein said follower on each said crank comprises a roller, and each of said cams on each said divergent flap includes a recess therein for receiving said roller, said recess having a shape corresponding to the shape of said cam.

* * * * *